United States Patent Office 2,806,424
Patented Sept. 17, 1957

2,806,424

PLANOGRAPHIC PRINTING PLATE

Anthony L. Ensink, Chicago, Ill.

No Drawing. Original application March 27, 1947, Serial No. 737,705. Divided and this application December 18, 1950, Serial No. 201,493

5 Claims. (Cl. 101—149.2)

This invention relates to a method of making printing plates. It has for one object to provide a plate of paper, cardboard or the like, having the characteristics of a lithographic stone and thus suitable for use as a printing plate.

This application is a division of the copending application Ser. No. 737,705, filed on March 27, 1947, now abandoned.

The present invention has for another object to provide a paper or comparable printing surface having a coating of an alignate. An object is, therefore, to provide a use for alginates in connection with the making of printing plates or sheets.

Another object is to provide an alginate coating which may be applied to supports or surfaces of various materials. The coating of the present invention might be applied to supports formed of metal, such as steel, aluminum, copper or zinc. It might be applied to glass or composition supports. Generally a flexible support is preferable.

The invention pertains primarily to lithographic plates, and has as an important object to provide an inexpensive method of lithographic reproduction from a typed, written, drawn or otherwise inscribed grease receptive image, and which will give a large number of faithful reproductions. It is recognized that previous attempts have been made with varying degrees of success to treat paper and other supports such as zinc, aluminum, copper, steel, flexible cellulose derivatives and synthetic resins. The object of this invention is to disclose what I believe the first use of sodium and ammonium alginates as a colloid for a printing plate, using the aforementioned supports.

Other objects will appear from time to time throughout the specification and claims.

The plate is prepared in the following manner: Upon a suitable sheet or web of paper such as sulphite or kraft, preferably of high wet strength, one or more coatings are applied to both sides to seal the fibers. This coating is, therefore, in effect a waterproofing coating. Many different suitable coatings are available for this purpose. The coatings may be formed of casein, urea-formaldehyde, melamine, resins, cellulose derivatives, chlorinated rubber and varnishes. Whatever material is chosen for coating the support above referred to, it may be applied in any manner—by a coating machine such as a roll coater, a brush coater or an air blade coater.

With the support coated as above described and dried, it is ready to receive the alginate coating which forms the printing surface. This printing surface coating consists of a solution of sodium alginate or ammonium alginate, preferably a solution of from 2½% to 3%. With the alginate in solution may be included one or more fillers. Typical fillers are barium sulphate, china clays and other clays, calcium carbonate and titanium dioxide. The ratio of dry alginates to dry fillers or pigments may be as high as one part alginate to five part fillers of one part alginate to eight part fillers.

The alginates are normally water soluble. A suitable method for rendering them insoluble includes the step of incorporating metal salts directly into the alginate pigment solution. The metal salts used in this operation are preferably aluminum chloride and zinc chloride (about ½% to 5%, based on the amount of dry alginate). Other metal salts such as calcium and iron may be used.

The alginate coating, with or without filler, may be applied first onto the water-proofed paper base sheet and the coating subsequently treated with the metal salts for insolubilization.

The alginates, fillers, pigments and metal salts are applied to the support or base as a suspension in water. The alginate solution may be applied to the support manually or otherwise. Several coats will normally be applied and each is dried before the next has been applied.

With a paper or other support suitably water-proofed and suitably coated with the alginate solution, it is ready for use. While it may be used in a number of ways, the three following methods are those of most general importance:

(1) The plate as prepared above may be used in what is known as a "direct image" printing plate. In this manner of use an image is made on the plate by typing, drawing or writing. This is done with a suitable ink or a pencil or an equivalent means. Thus one or more grease receptive areas are formed on the plate and they are predetermined by the manner in which they are formed, as by typing or drawing, etc. The plate with the image thus formed is put into an offset printing press and by the usual offset method a large number of copies can be made of the original impression.

Preferably before the plate is actually put on or in an offset press, it is "wetted out" with an etching solution. The etching solution renders water-receptive and wets those areas on the plate where no deposits of printing, drawing, writing or other images have taken place. These areas repel the ink, whereas the image written, drawn or typed on the plate is grease receptive and retains the ink.

Many suitable etching solutions are available. Among them is a gum arabic solution with barium nitrate and water. Another is an oxalic acid solution with ammonium sulphate and nitric acid in a weak solution. The invention is not limited to these particular etching solutions nor to any other etching solution. Those mentioned are referred to merely as comprising suitable etching solutions.

In using the plate, the etching solution or a dilute form of an etching solution, which is normally called the "fountain" solution, is kept constantly on the plate to wet it in the manner well-known in offset printing. The result of the steps and treatment above described is that the surface of the plate rejects greasy ink at all points except those on which printing, writing, drawing or other predetermined images have been formed.

(2) A second important use for sodium alignate and ammonium alginate is as a light-sensitive coating which is prepared of sodium alignate or other alignates, and ammonium bichromate. This coating can be applied by hand or by mechanical means to the plate made as described above. It is applied to the plate as a solution in water and is dried on the plate.

A suitable formula for the coating may be made according to the following proportions: 4 ounces of a 2% solution of low viscosity alignates; 6 ounces of water: and 4 ounces of a 10% ammonium bichromate solution.

Many variations may be made in the above formula without departing from the spirit of this invention. Plasticizers such as glycerine, glucose, "Calgon" (sodium hexametaphosphate), or sorbitol can be added to prevent breaking of the film of the coating, which might otherwise occur, due to its relative brittleness. One or more of such plasticizers may be included in any formula.

The plate made as described above and now coated with the light-sensitive formula above mentioned or its equivalent is ready for use when the coating is dried. The plate may be put into a vacuum or other printing frame in contact with a negative. It is then exposed to light, preferably an arc light or an equally strong light source, for a length of time depending upon the distance of the light from the plate and the quality of the negative, and after suitable exposure the plate is removed from the frame or other holding means and is separated from the negative. Developing ink, which is well-known in the art, is applied to the plate and the plate is developed out in the usual known manner. Excess developing ink is removed and the plate is preferably put under running water to remove the ink on all areas except those which have been hardened and made insoluble by the light. The hardened and insolubilized areas are receptive to printing inks.

After these steps the plate, to which the coating of bichromate sensitized alginate has been applied, is ready for use and may be put into an offset printing press fo making reproductions. The plate, once made as described above, may be used for a large number of reproductions.

(3) A third important application of sodium alginate and ammonium alginate embodies the method of using the plate above described and making that plate a photosensitive plate. The method for doing this comprises the treatment of the plate either with a sodium alginate solution or an ammonium alginate solution to which silver salts are added, such as silver bromide, silver chloride and silver iodide, or any combination thereof.

This coating can be applied to the plate described above, whether that plate be formed of paper or another support or metallic support, or any of the plate supports previously mentioned in connection with the basic preparation of the plate. The formula below described will produce a photosensitive halide emulsion, the colloid of which is an alginate, in place of the gelatin or other products known in the art, such as polyvinyl alcohol and other known materials.

A suitable formula for use in making a photosensitive alginate emulsion is as follows: 250 grams of a 2% solution of sodium alginate or ammonium alginate. To this is added 18 grams of ammonium bromide and 1 gram of potassium iodide, which are dissolved in 100 grams of water. To the combined solution of alginates and bromides the following solution is added: 30 grams of silver nitrate dissolved in 50 grams of water and 25 grams of ammonium hydroxide.

This photosensitizing coating process must be carried out under conditions such as those prevailing in the manufacture of photosensitive products.

The plate formed with the photosensitive silver alginate is suitably dried and is then ready for exposure, developing and fixing operations and for further use. The important feature of this photosensitized plate is that it can be stored for a long time without losing its qualities and being instantly ready for practical use. For actual use, the plate, together with a negative, is subjected to light of suitable intensity, such as incandescent light. The plate, thus sensitized, may be used either for contact printing or enlargement and after a suitable exposure the usual photographic steps of developing and fixing are carried out and thereby the exposed silver salts are reduced to metallic silver.

Since the ultimate use of the photosensitive silver alginate plate is the creating of a surface from which many reproductions can be made by lithographic printing or by other printing methods, other steps are then carried out. The reduced metallic silver now present in the developed and fixed plate is not grease receptive—that is to say, it does not accept greasy inks. Therefore, the reduced metallic silver is then converted into a chromate salt by the use of a suitable bleaching agent. This agent may comprise copper sulphate (10% solution), potassium bromide (10% solution) and chromic acid or ammonium bichromate (1% solution). Sample formula: 500 cc. copper sulphate solution; 500 cc. potassium bromide solution; 100 cc. of either chromic acid or ammonium bichromate solution. After the plate has been treated with the bleach, the image is grease receptive.

After the bleaching operation, the plate is treated with the developing ink in the manner described above, in the second method describing the making of the light-sensitive plate, and upon the completion of that treatment it is ready for use as an offset printing plate. An important feature is the rendition of high fidelity reproductions obtained with this plate.

Much of the discussion above has referred to paper supports for the plate. However, the invention is not limited to that support nor to a support of any particular nature. The alginate coatings above described may be applied to metal supports or, in fact, to any supports capable of carrying the coating and capable of use in a printing process.

The invention is not limited to the use of silver salts and may be embodied in the use of many different metallic salts. In particular, aluminum and zinc salts may be used, and so also may chromium salts. The invention is, therefore, not limited to the use of silver salts.

I have now disclosed the use of alginates in printing plates of three forms or types—first, as a coating adhering to a support for use as a direct image printing plate; second as a light-sensitive plate using alginates with which bichromate salts are incorporated; and third, as a photosensitive plate in which silver salts are incorporated.

I claim:

1. A planographic printing plate comprising a base sheet and a hydrophilic coating on the base sheet having an insolubilized alginate as the sole effective hydrophilic colloid, an inert filler, and an image formed of an ink receptive, water repellent material anchored on the hydrophilic colloid coating.

2. A planographic printing plate comprising a base sheet and a hydrophilic lithographic surface on the base sheet having an insolubilized alginate as the sole effective hydrophilic colloid, an inert filler in finely divided form dispersed with the colloid in amounts ranging from one part by weight of colloid to 5 to 8 parts by weight filler, and an image formed of an ink receptive, water repellent material anchored on the hydrophilic colloid coating.

3. A lithographic printing plate comprising a paper base sheet and a continuous hydrophilic, lithographic coating on the surface of the base sheet having an insolubilized polyvalent metal salt of alginic acid as the effective colloid and in which the coating contains an inert filler in uniform distribution with the alginate and an image formed of an ink receptive, water repellent material anchored on the surface of the hydrophilic lithographic coating.

4. A lithographic printing plate comprising a paper base sheet and a continuous, hydrophilic, lithograhic coating on the surface of the base sheet having an insolubilized polyvalent metal salt of alginic acid as the effective colloid and in which the coating contains an inert filler present in amounts ranging from 5–8 parts by weight of the filler to 1 part by weight of the alginate in uniform distribution throughout the coating, and an image formed of an ink receptive, water repellent material anchored on the surface of the hydrophilic lithographic coating.

5. A lithographic printing plate comprising a paper base sheet and a continuous, hydrophilic, lithographic coating on the surface of the base sheet having the effective colloid formed of the reaction product of an alginate and a water soluble polyvalent metal salt in which the latter is present in an amount ranging from 0.5 to 5.0 percent by weight of the alginate and inert siliceous filler, and an image formed of an ink receptive, water repellent material anchored on the hydrophilic lithographic coating.

References Cited in the file of this patent

UNITED STATES PATENTS

| | | |
|---|---|---|
| 349,760 | Stanford | Sept. 28, 1886 |
| 1,162,926 | Ingham | Dec. 7, 1915 |
| 1,361,783 | Thornton | Dec. 7, 1920 |
| 1,521,509 | Dorel | Dec. 30, 1924 |
| 1,759,956 | Reed | May 27, 1930 |
| 2,184,310 | Meigs et al. | Dec. 26, 1939 |
| 2,230,981 | Toland et al. | Feb. 4, 1941 |
| 2,290,633 | Cate | July 21, 1942 |
| 2,361,665 | Toland et al. | Oct. 31, 1944 |
| 2,366,439 | Chilton et al. | Jan. 2, 1945 |
| 2,399,208 | Coolidge | Apr. 30, 1946 |
| 2,534,650 | Worthen | Dec. 19, 1950 |
| 2,542,784 | Van Dusen | Feb. 20, 1951 |
| 2,582,347 | Newman | Jan. 15, 1952 |

FOREIGN PATENTS

| | | |
|---|---|---|
| 897,220 | France | May 15, 1944 |

OTHER REFERENCES

Structural Carbohydrate Chemistry (Percival). Published by Frederick Muller Ltd., 29 Great James Street, W. C. 1, London, England, 1950, pages 158, 159, 160 and 161. Copy in Scientific Library.